UNITED STATES PATENT OFFICE.

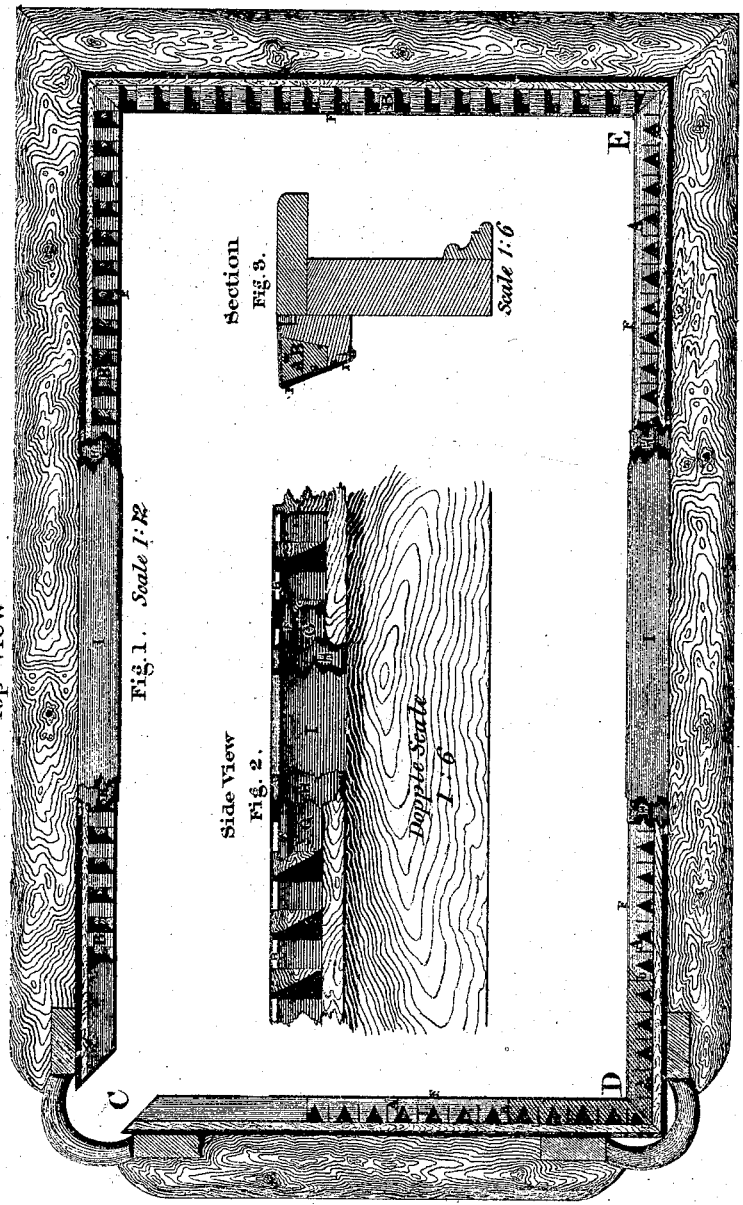

GEORGE SMITH, OF DETROIT, MICHIGAN.

IMPROVEMENT IN BILLIARD-TABLES.

Specification forming part of Letters Patent No. 118,288, dated August 22, 1871.

*To all whom it may concern:*

Be it known that I, GEORGE SMITH, of Detroit, in the county of Wayne and State of Michigan, have invented a new and useful Improvement in Billiard Rubber Cushions; and I do hereby declare that the following is a full, clear, and exact description of the construction and operation of the same, reference being had to the annexed drawings making a part of this specification, in which—

Figure 1 is a top view; Fig. 2, a side view; and Fig. 3, a section.

A A B B is the improved rubber cushion, instead of a continuous rubber strip. The cuts in the rubber from the top can be either wedge-shaped, rectangular, circular, or whatever form the inventor may choose to apply. C, old pocket billiard-table; D, transformed pocket-table into a carrom-table; E, corner of a carrom-table newly made; F, whalebone or hoop-skirt spring, to distribute the elasticity of the cushion and to prevent the ball from jumping. G is a thin rubber cloth to connect the rubber blocks. H is an underlayer of thin rubber for the cloth-cover; I, the cloth. *a b* show the alteration of any old pocket-table into a carrom-table by taking out the old rubber and cutting out the form, as above described.

What I claim as my invention, and desire to secure by Letters Patent, is—

Rubber billiard-cushions cut from the top to the table in wedge-shape, or in a rectangular, semicircular, curved, or other form, substantially as shown and described, and having the points or projections connected at the edge by a whalebone strip, hoop-skirt spring, or other similar device, in the manner set forth.

GEORGE SMITH.

Witnesses:
D. JUNG,
EDUARD ECCARD.